(12) United States Patent
Tabuchi et al.

(10) Patent No.: US 7,483,352 B2
(45) Date of Patent: Jan. 27, 2009

(54) RECORDING MEDIUM REPRODUCTION DEVICE

(75) Inventors: Jyun Tabuchi, Kobe (JP); Tatsuya Yamaguchi, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 365 days.

(21) Appl. No.: 10/568,048

(22) PCT Filed: Aug. 9, 2004

(86) PCT No.: PCT/JP2004/011715

§ 371 (c)(1),
(2), (4) Date: Feb. 10, 2006

(87) PCT Pub. No.: WO2005/015559

PCT Pub. Date: Feb. 17, 2005

(65) Prior Publication Data

US 2006/0206750 A1    Sep. 14, 2006

(30) Foreign Application Priority Data

Aug. 12, 2003    (JP) ............................. 2003-207363

(51) Int. Cl.
*G11B 7/00* (2006.01)
(52) U.S. Cl. ................. 369/47.22; 369/47.27; 369/53.1; 369/53.13
(58) Field of Classification Search ............... 369/47.1, 369/47.27, 47.28, 47.13, 275.3, 59.22, 53.21, 369/47.18, 47.22, 53.1, 53.12, 53.13, 53.17, 369/53.42
See application file for complete search history.

(56) References Cited

U.S. PATENT DOCUMENTS

| | | | | |
|---|---|---|---|---|
| 6,174,170 B1 * | 1/2001 | Olmedo | ................. | 434/307 A |
| 6,473,376 B1 * | 10/2002 | Tsuda et al. | ............. | 369/47.21 |
| 6,519,676 B1 * | 2/2003 | Suzuki et al. | ............... | 711/112 |
| 6,961,903 B2 * | 11/2005 | Suzuki et al. | ............... | 715/716 |

FOREIGN PATENT DOCUMENTS

| | | |
|---|---|---|
| JP | 59153227 | 9/1984 |
| JP | 3069066 | 3/1991 |
| JP | 7121333 | 5/1995 |
| JP | 10247357 | 9/1998 |
| JP | 11015672 | 1/1999 |
| JP | 2000-113644 | 4/2000 |
| JP | 2000-156074 | 6/2000 |
| JP | 2003-009060 | 1/2003 |
| JP | 2003-178536 | 6/2003 |

* cited by examiner

*Primary Examiner*—Nabil Z Hindi
(74) *Attorney, Agent, or Firm*—Fogg & Powers LLC; Gregory Taylor

(57) ABSTRACT

An abnormality in text data recorded on a CD conforming CD-TEXT format is detected so that a proper display can be created. In the case of text data recorded in a double-byte character code (step 1002), if the text data is XX 00 (step 1006) or 00 XX (step 1008), it is determined that abnormality has been detected. Alternatively, a character position is determined by counting recorded characters, and the character position is compared with recorded character position information to detect the presence or absence of abnormality.

9 Claims, 5 Drawing Sheets

RECORDING MEDIUM REPRODUCTION DEVICE

TECHNICAL FIELD

The present invention relates to a recording medium playback apparatus having the function of reading character codes recorded on a recording medium and, more particularly to a recording medium playback apparatus suited to read character codes recorded along with audio playback digital data on a recording medium such as a CD, a DVD, or an MD.

BACKGROUND ART

For example, on a CD (compact disc) that conforms to the CD-TEXT format, character data for presenting the title of music recorded on each track, artist name, etc. for display on an operation panel is recorded in addition to the audio playback digital data recorded on conventional CD.

Such character data can be written by a user using a CD-R writer. However, when character data is written to a CD by using a CD-R writer, there can occur cases where data that does not conform to the standard is written due to errors on the part of the user. If such data is to be displayed as is, totally unintelligible characters may be displayed. Further, there can occur cases where a null code indicating a track separation cannot be detected and, as a result, the character data acquisition process does not terminate, endlessly trying to acquire the character data and thus resulting in an inability to proceed to the audio playback process.

DISCLOSURE OF THE INVENTION

Accordingly, an object of the present invention is to provide a recording medium playback apparatus that can detect an abnormality in the data format of the character data recorded on a recording medium such as a CD conforming to the CD-text format, and can perform appropriate processing for display.

A recording medium playback apparatus according to the present invention comprises: a determining unit making a determination as to the presence or absence of abnormal data wherein, when character code for text data recorded on a recording medium is a double-byte character code, if only one of two bytes forming the double-byte character code at the present check position coincides with a predetermined special code, the determining unit determines that abnormal data is recorded; and a repeating unit updating the check position and causing the determining unit to repeat the determination.

For example, a plurality of tracks of audio playback digital data are further recorded on the recording medium, the text data is recorded in corresponding relationship to each track of the audio playback digital data, and the special code is a null code indicating a track separation.

A recording medium playback apparatus according to an alternative mode of the present invention comprises: a character position detecting unit detecting a character position for at least one of character codes contained in text data recorded on a recording medium; and a determining unit for determining that abnormal data is recorded, if the character position detected by the character position detecting unit contradicts character position information recorded on the recording medium.

For example, a plurality of tracks of audio playback digital data are further recorded on the recording medium, the text data is recorded in corresponding relationship to each track of the audio playback digital data, and the character position is a character position within a string of characters recorded in each track.

The above-described apparatus further comprises an output unit outputting characters corresponding to the text data recorded on the recording medium, wherein when it is determined by the determining unit that abnormal data has occurred, the output unit can stop outputting the characters.

The above-described apparatus may further comprise a changing unit changing a character separating position for reading a double-byte character code when it is determined by the determining unit that abnormal data has occurred.

BEST MODE FOR CARRYING OUT THE INVENTION

Figure 1:
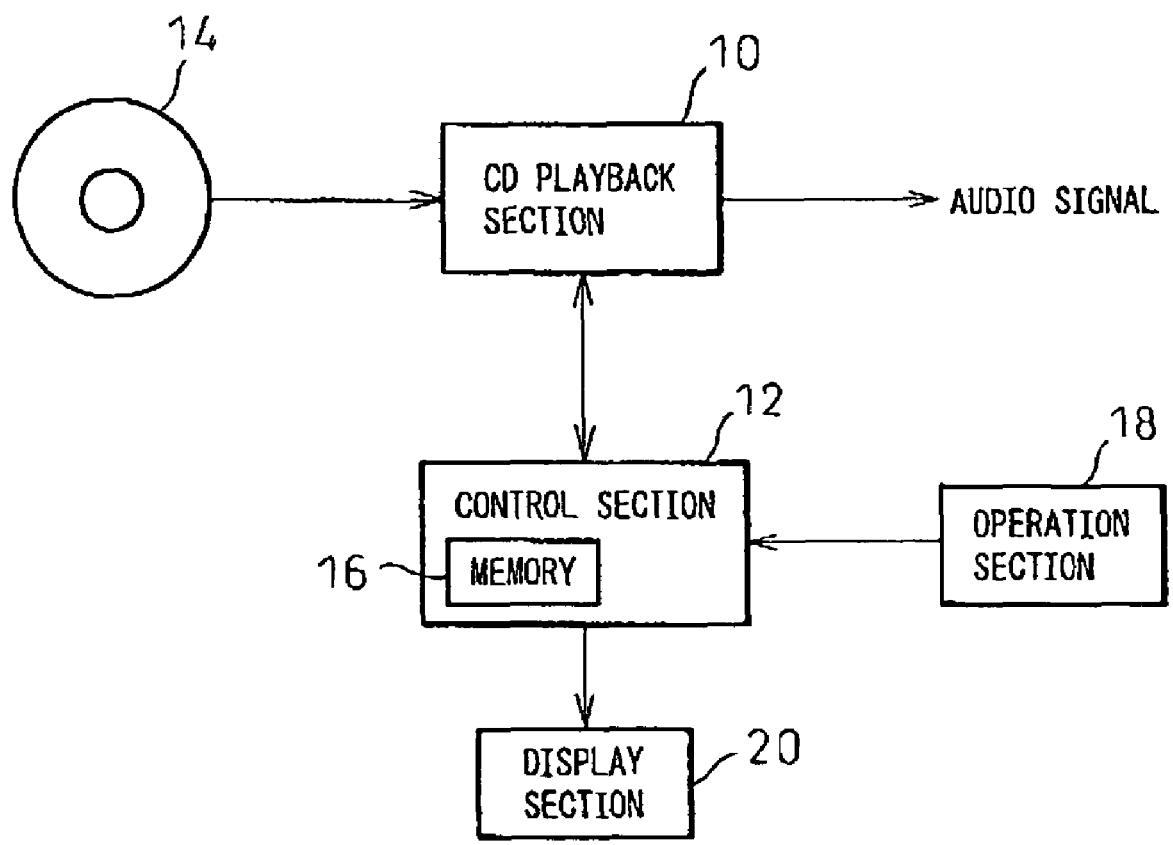
FIG. 1 is a block diagram schematically showing the configuration of a CD player according to one embodiment of a recording medium playback apparatus of the present invention.

FIG. 1 is a diagram schematically showing the configuration of a CD-TEXT compatible CD player according to one embodiment of a recording medium playback apparatus of the present invention.

In FIG. 1, a CD playback section 10, under instruction from a control section 12, reads out character data such as the titles of music recorded on a CD 14, artist names, etc. from the lead-in area of the CD 14. The character data thus read out is temporarily stored in a memory 16 internal to the control section 12. Further, under instruction from the control section 12, the CD playback section 10 reads out a digitized audio signal from each track in the program area of the CD 14, and plays back the audio signal for output. In synchronism with this, or in accordance with an operation performed on an operation section 18, the control section 12 outputs the characters showing the titles of music, artist names, etc., based on the character data stored in the memory 16, for display on a display section 20.

Figure 2:
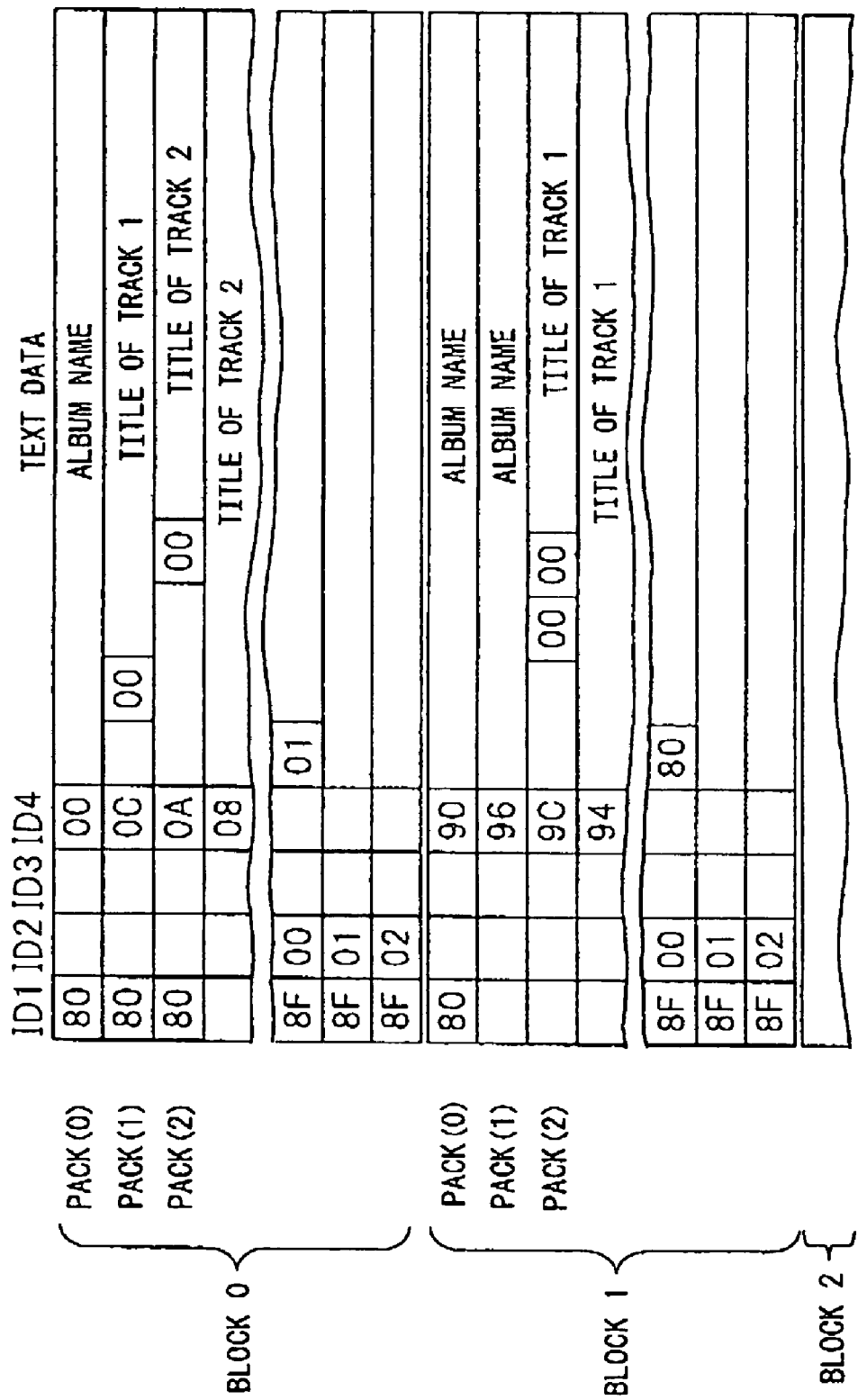
FIG. 2 is a diagram showing one example of character data recorded on a CD conforming to the CD-TEXT format.

FIG. 2 shows the format of character data recorded on R-W channels in the lead-in area of a CD conforming to the CD-TEXT format. To simplify error processing, the character data shown in FIG. 2 is recorded in the lead-in area by repeating the same data a plurality of times.

In FIG. 2, the character data comprises a plurality of blocks consisting of block 0, block 1, and so on, and each block comprises a plurality of packs consisting of pack (0), pack (1), and so on. Each pack is 18 bytes long. In each pack, the first four bytes ID1 to ID4 are followed by text data written with 12 bytes of character codes. The text data is followed by a two-byte CRC field not shown in FIG. 2.

In each block, the first byte of the text data field of the pack whose ID1 is 8F (hexadecimal, the same applies hereinafter) and whose ID2 is 00 designates the character code used in the block to which the pack belongs. For example, when this byte is 00 or 01, the character code used in that block is a single-byte character code, while when the byte is any one of 80 to 82, a double-byte character code is used in that block. In the example shown in FIG. 2, since, in the block 0, 01 is recorded in the first byte of the text data field of the pack whose ID1 is 8F and whose ID2 is 00, a single-byte character code (ISO 646 ASCII) is used in the block 0. In the block 1, on the other hand, the first byte of the text data field of the pack whose ID1 is 8F and whose ID2 is 00 carries 80, which means that a double-byte character code (MS-JIS) is used in the block 1.

In the text data fields of the packs whose ID1 is 80, album name and the titles of music recorded in the respective tracks are recorded contiguously, with a null code 00 (in the case of a single-byte character) or 00 00 (in the case of a double-byte character) recorded to separate each track. In the example shown in FIG. 2, in the block 0, the album name is recorded using the text data field of the pack (0) and the first byte of the pack (1); then, following a null code 00, the title of the track 1 is recorded using the area up to the third byte of the pack (2) and, following another null code 00, the title of track 2 is recorded. In the block 1, the album name is recorded in the double-byte character code using the text data fields of the packs (0) and (1) and the first two bytes of the pack (2); then, following a two-byte null code 00 00, the title of track 1 is recorded in the double-byte character code.

Figure 3:
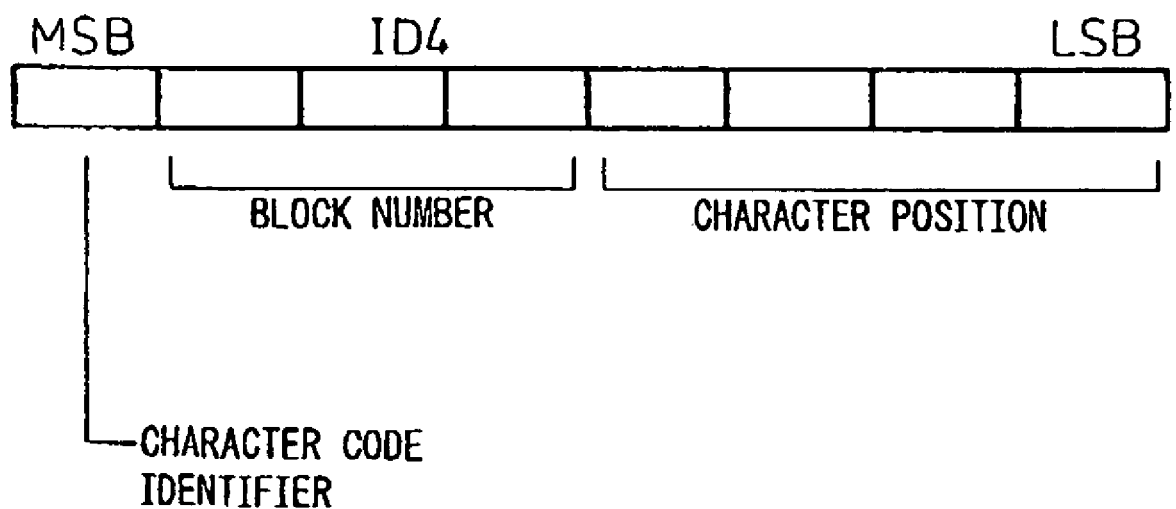
FIG. 3 is a diagram showing the data format of ID4.

The byte ID4 in each of these packs carries a character code identification bit, block number, and character position that are recorded in the format shown in FIG. 3. It is also possible to know whether the character code used is a single-byte character code or a double-byte character code by referring to the MSB of the ID4. In the lower four bits of the ID4 of each pack, the character position indicating the ordinal position that the first character of the text data in that pack holds within the track to which that character belongs is recorded using a number starting with 0. In the example shown in FIG. 2, the first character of the pack (2) in the block 1 is the 13th character of the album name recorded in the double-byte character code; therefore, "9C" is recorded in the ID4 of the pack (2) in the block 1.

As earlier described, when the text data is recorded in a double-byte character code, the track separation code is a two-byte null code 00; therefore, the characters before and after that are recorded, for example, as "6B 79 00 00 82 B3". Here, if the double-byte character separating position is displaced, for example, due to an error at the time of writing, the characters may be recognized, for example, as "79 00 00 82 B3 8A", resulting in garbled characters or an inability to recognize an end code. In view of this, if any set of two bytes forming a double-byte character code is detected in which, of the two bytes, only one byte coincides with the null code, as in "XX 00" or "00 XX" (XX is an arbitrary hexadecimal number other than 00), then it is determined that abnormal data is recorded.

Figure 4:
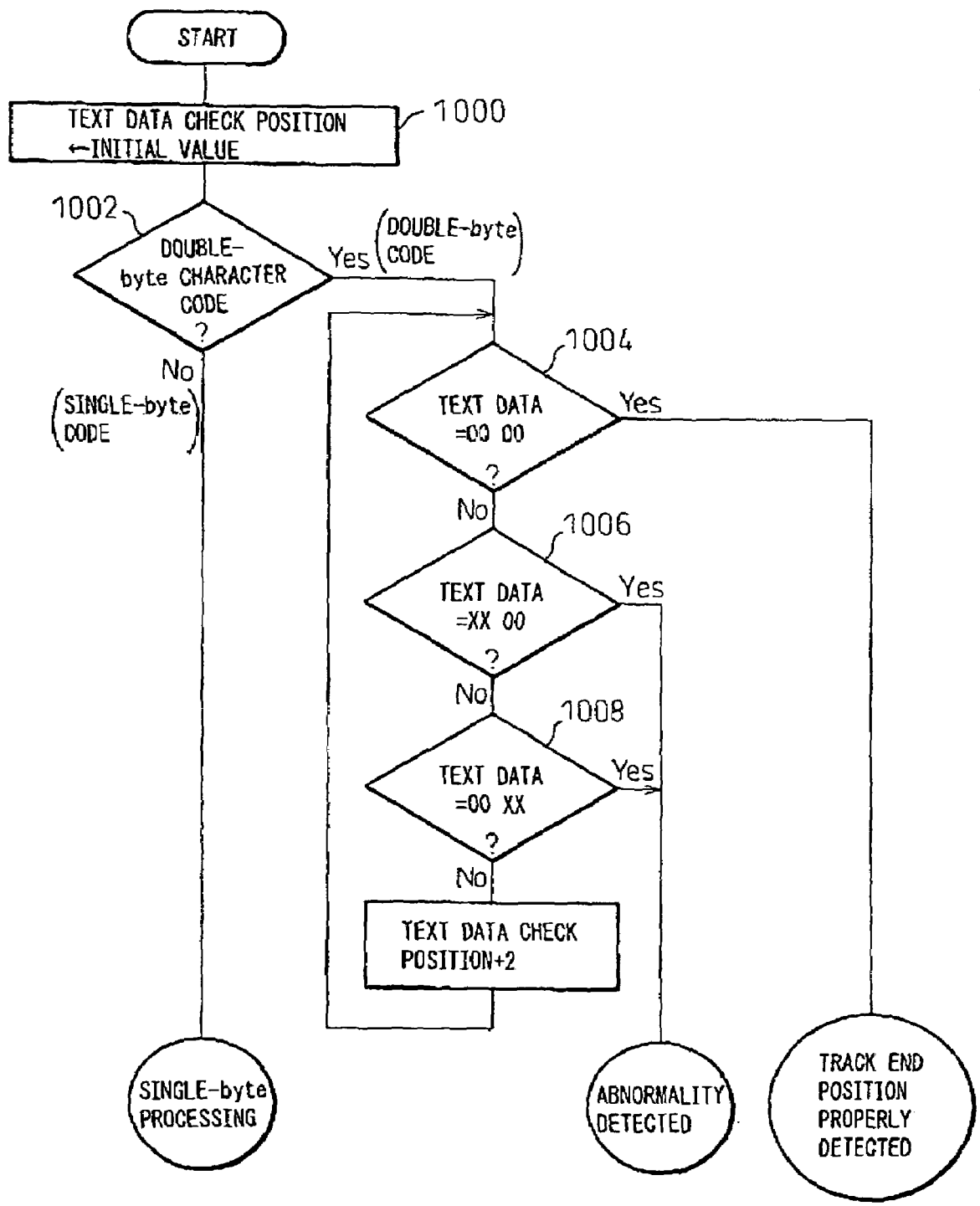
FIG. 4 is a flowchart illustrating a first example of an abnormal data detection process according to the present invention.

FIG. 4 is a flowchart illustrating a first example of the abnormal data detection process based on the above idea. In FIG. 4, first a text data check position is set to its initial value such as the beginning of the text data in the block or the beginning of the track (step 1000). Then, it is determined whether the text data is recorded in a double-byte character code or not (step 1002) and, if the data is recorded in a single-byte character code, the usual single-byte processing is performed. This determination is made, as earlier described, by referring to the first byte of the text data field of the pack whose ID1 is 8F and whose ID2 is 00 or by referring to the most significant bit of the ID4 of each pack. If the data is recorded in a double-byte character code, then, if the text data at the present text data check position is "00 00" (step 1004), it is determined that the track end position has been properly detected, and the process is terminated. On the other hand, if the text data at the present text data check position is "XX 00" (step 1006) or "00 XX" (step 1008), it is determined that abnormal data has been detected. Otherwise, the text data check position is updated by two bytes, and the process from step 1004 on is repeated. In this way, an abnormality, if any, in the text data can be detected.

As previously described, in the lower four bits of the ID4 of each pack, the character position indicating the ordinal position that the first character of the text data in that pack holds within the track to which that character belongs is recorded using a single-digit hexadecimal number starting with 0. Accordingly, an abnormality in the text data, if any, can be detected by actually examining the ordinal position of the character recorded at the beginning or end of the pack and by checking that it does not contradict the information carried in the ID4.

Figure 5:
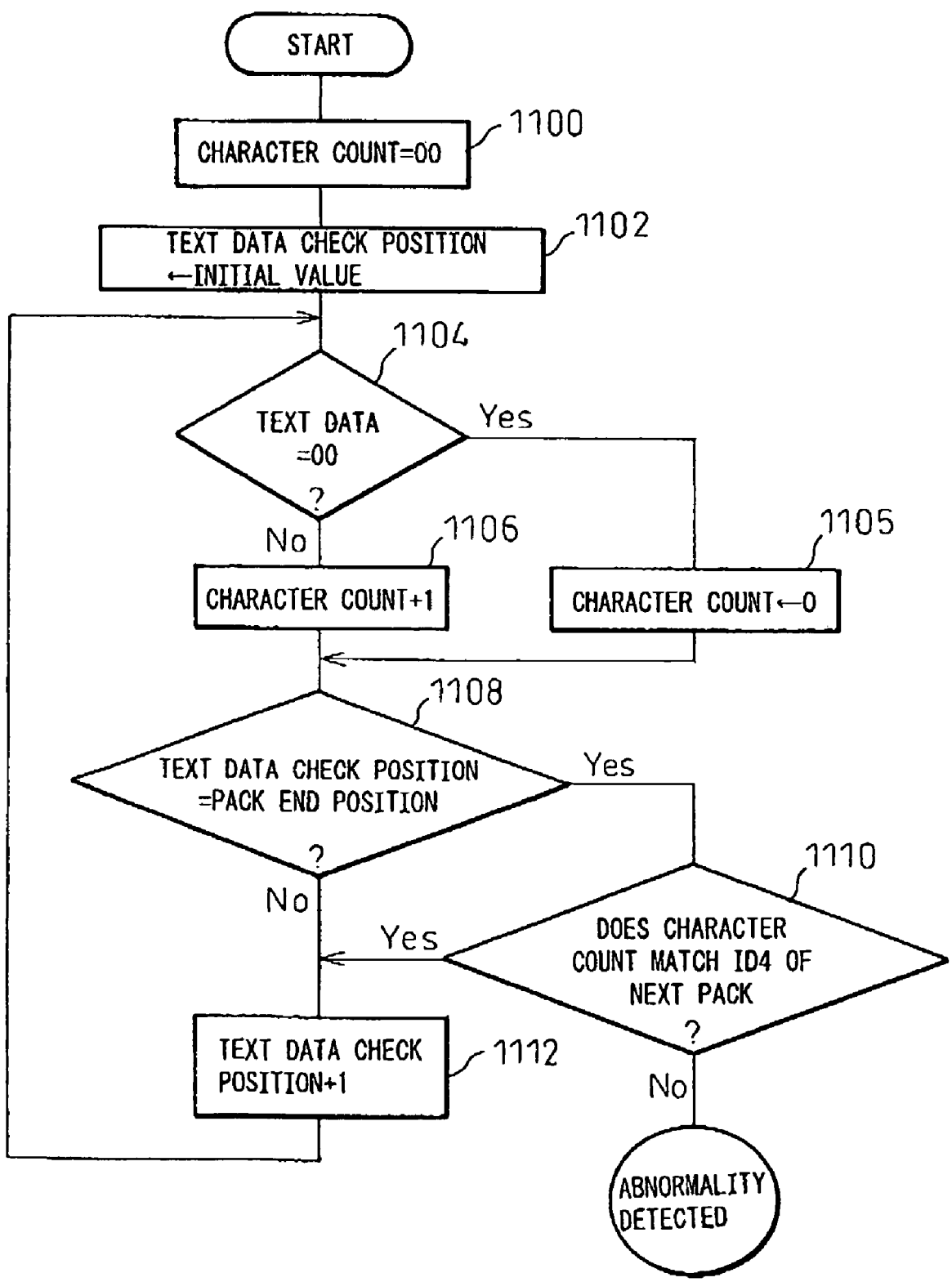
FIG. 5 is a flowchart illustrating a second example of the abnormal data detection process according to the present invention.

FIG. 5 is a flowchart illustrating a second example of the abnormal data detection process based on this idea. In FIG. 5, the character count is reset to 0 (step 1100), and the text data check position is set to its initial position (step 1102). The text data at the text data check position is examined to see if it is a null code 00 (step 1104); if it is a null code, the character count is reset to 0 (step 1105), but if it is not a null code, the character count is incremented by 1 (step 1106). Next, the text data check position is examined to see if it coincides with the end position of the pack (step 1108); if it coincides with the end position of the pack, then the present character count is examined to see if it does not contradict the value of the lower four bits of the ID 4 of the next pack (step 1110). That is, if the character code is a single-byte character code, the character count must match the lower four bits of the ID 4 of the next pack; on the other hand, if the character code is a double-byte character code, the character count divided by two must match the lower four bits of the ID 4 of the next pack. If they do not match, then it is determined that abnormal data has been detected, but if they match, the text data check position is incremented by 1 (step 1112), and the process from step 1104 on is repeated.

For any text data in which an abnormality is detected in the abnormal data detection process shown in FIG. 4 or 5, abnormal display can be prevented by performing processing not to display such text data or by changing the double-byte character separating position so as to correct the detected displacement.

The above-described process can be implemented by a software program created by programming the operations of the CPU (not shown) built into the control section 12 shown in FIG. 1.

As described above, according to the present invention, there is provided a playback apparatus that can detect an abnormality in the text data recorded on a recording medium and can perform appropriate processing for display.

What is claimed is:

1. A recording medium playback apparatus comprising:
a determining unit making a determination as to the presence or absence of an error, wherein
when character code for text data recorded on a recording medium is a double-byte character code, if only one of two bytes forming the double-byte character code at present check position coincides with a predetermined special code, said determining unit determines that an error has occurred.

2. An apparatus as claimed in claim 1, further comprising a repeating unit updating said check position and causing said determining unit to repeat said determination.

3. An apparatus as claimed in claim 1, wherein a plurality of tracks of audio playback digital data are farther recorded on said recording medium, said text data is recorded in corresponding relationship to each track of said audio playback digital data, and said special code is a null code indicating a track separation.

4. An apparatus as claimed in claim 1, farther comprising an output unit outputting characters corresponding to said text data recorded on said recording medium, wherein when it is determined by said determining unit that abnormal data has occurred, said output unit stops outputting said characters.

5. An apparatus as claimed in claim 1, further comprising a changing unit changing a character separating position for reading said double-byte character code when it is determined by said determining unit that abnormal data has occurred.

6. A recording medium playback apparatus comprising:

a character position detecting unit detecting character position for at least one of the character codes contained in text data recorded on a recording medium; and a determining unit determining that abnormal data is recorded, if said character position detected by said character position detecting unit contradicts character position information recorded on said recording medium.

7. An apparatus as claimed in claim 6, wherein a plurality of tracks of audio playback digital data are further recorded on said recording medium, said text data is recorded in corresponding relationship to each track of said audio playback digital data, and said character position is a said character position within a string of characters recorded in each track.

8. An apparatus as claimed in claim 6, further comprising an output unit outputting characters corresponding to said text data recorded on said recording medium, wherein when it is determined by said determining unit that abnormal data has occurred, said output unit stops outputting said characters.

9. An apparatus as claimed in claim 6, further comprising a changing unit changing a character separating position for reading a double-byte character code when it is determined by said determining unit that abnormal data has occurred.

\* \* \* \* \*